United States Patent
Eipper

(10) Patent No.: US 6,250,702 B1
(45) Date of Patent: Jun. 26, 2001

(54) VEHICLE WITH A TABLE BOARD

(75) Inventor: Konrad Eipper, Rottenburg (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/570,487

(22) Filed: May 12, 2000

(30) Foreign Application Priority Data

Jun. 23, 1999 (DE) .............................. 199 28 723

(51) Int. Cl.[7] .................................................. B62C 1/06
(52) U.S. Cl. ..................... 296/26.1; 296/26.09; 297/170; 108/44
(58) Field of Search ............................. 296/26.08, 26.09, 296/26.1, 26.11, 26.12, 26.13, 26.14, 26.15, 63, 65.01, 65.05; 297/173, 170, 171, 172, 174; 108/44

(56) References Cited

U.S. PATENT DOCUMENTS

| | | |
|---|---|---|
| 1,789,982 | 1/1931 | Lengyel . |
| 2,867,471 * | 1/1959 | Doon, Jr. . |
| 3,912,324 | 10/1975 | Troyer . |
| 4,375,306 | 3/1983 | Linder . |
| 4,455,948 | 6/1984 | Torres . |
| 4,852,499 | 8/1989 | Ozols . |
| 5,511,493 | 4/1996 | Kanehl, Jr. . |
| 5,575,521 * | 11/1996 | Speis .............................. 296/26.11 X |
| 5,588,697 | 12/1996 | Yoshida et al. . |
| 5,771,815 | 6/1998 | Leftwich . |
| 5,857,741 | 1/1999 | Anderson . |

FOREIGN PATENT DOCUMENTS

| | | |
|---|---|---|
| 2647891 | 5/1977 | (DE) . |
| 229556 | 7/1987 | (DE) . |
| 9217039 U | 3/1993 | (DE) . |

* cited by examiner

Primary Examiner—Joseph D. Pape
(74) Attorney, Agent, or Firm—Mark P. Calcaterra

(57) ABSTRACT

A vehicle having a table board is provided. The table board is moveable between an out-of-use position, in which the table board is accommodated in the vehicle, and a position of use, in which the table board projects longitudinally from the vehicle. At least one seat is mounted in such a way on the table board, through a folding linkage, such that in the position of use of the table board, the seat can be pivoted between a space-saving out-of-use position and a position of use suitable for sitting at the table board.

10 Claims, 2 Drawing Sheets

VEHICLE WITH A TABLE BOARD

BACKGROUND OF THE INVENTION

1. Technical Field

The present invention relates in general to motor vehicles. More particularly, the invention relates to a passenger car having a table board. More specifically, but without restriction to the particular embodiment and/or use which is shown and described for purposes of illustration, the present invention relates to a vehicle having a moveable table board that includes supporting and seating elements.

2. Discussion

DE 92 17 039 U1 has disclosed a passenger car in which a load surface of a luggage compartment can be moved out of the luggage compartment for loading and unloading. With the vehicle tailgate open, the load surface can here be adjusted horizontally between an out-of-use position, in which the load surface is accommodated completely in the luggage compartment, and a position of use, in which the load surface projects longitudinally or rearwards from the vehicle. The loading and unloading of this load surface is thus simplified. In the case of a passenger car in which the load surface is at a relatively high level above the underlying surface on which the vehicle is standing, the known extendable load surface can also be used as a table.

DT 26 47 891 A1 has disclosed a folding table/seat combination in which a table board and at least one seat can be pivoted relative to one another between a set-up position, in which the table board and the seat are horizontal and a front edge of the seat is close to one end of the table board and underneath this end, and a folded position, in which the seat is essentially parallel to the table board. Moreover, the known folding table/seat combination has a folding stand which, on the one hand, supports the table board and the seat in the set-up position and, on the other hand, allows the table board and the seat to be pivoted into the folded position or into the set-up position.

As illustrated by the above examples, many activities would be facilitated by having a table-like surface for various items. In fact, many activities center around automobiles and the ability to provide a table board would be extremely advantageous. For example, the activity commonly referred to as 'tailgating' could be more convenient if a table was available for the purpose of supporting food and drink thereon. In fact, this activity most likely received the name 'tailgating' by individuals using the tailgate of a pick-up truck either as a table or as a seating surface for the participants. However, those individuals that would like to participate in such an activity without a pick-up truck need to transport a table within the interior of their vehicle, which is inconvenient and takes up desired interior space. Even having a pick-up truck only provides a crude type of table board and a limited and awkward seating ability.

There is, therefore, a need to provide a vehicle table board that includes seating and support elements that can be used in a convenient manner. There is also a need to provide a table structure that is easy to use and is stored compactly in the interior of the vehicle which will increase customer convenience.

SUMMARY OF THE INVENTION

Accordingly, it is the principal objective of the present invention to provide a table board for a motor vehicle that includes support and seating elements.

The invention is based on integrating seats provided for use on or with the table board into the table board, i.e. the table board and the associated seats form a single unit. This ensures that there are always enough seats. Moreover, it is thereby possible to achieve space-saving accommodation of the seats in the vehicle in a simple manner.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be written in conjunction therewith, and like reference numerals are employed to designate identical components in various views.

DETAILED DESCRIPTION OF THE PREFERRED EMBODIMENT

Figure 1:
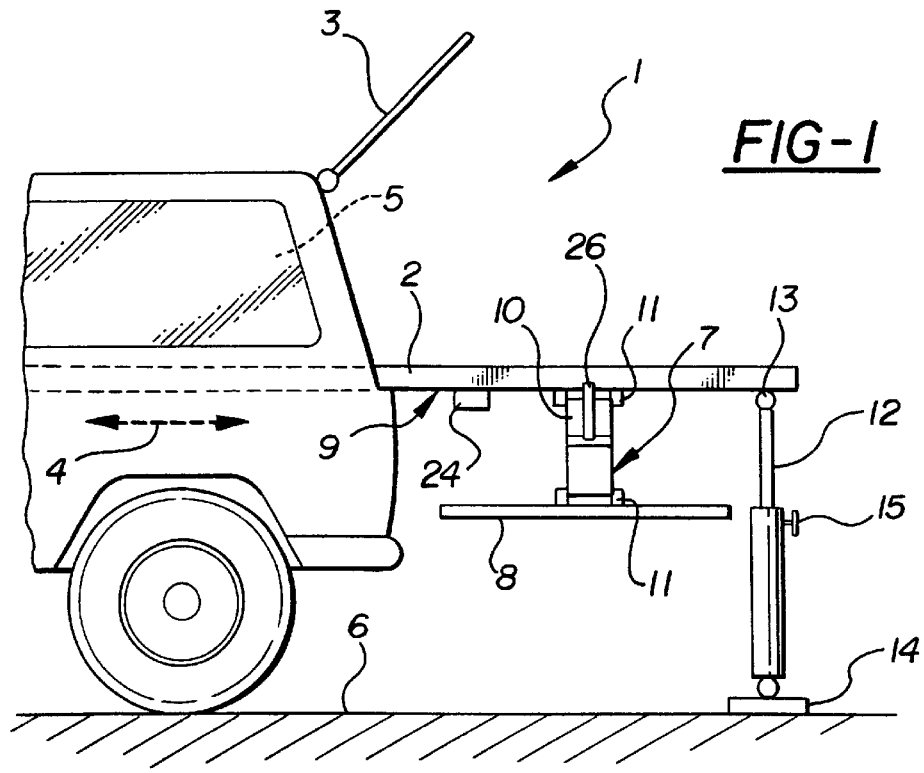
FIG. 1 shows a side view of a rear area of a vehicle according to the invention in a first embodiment.

An apparatus comprising a table board for a vehicle is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Referring now to the drawings, a vehicle 1, according to the preferred embodiment of the present invention, is equipped with a table board 2 which can be extended horizontally as shown by a double arrow 4, i.e. parallel to the plane of the table board 2, from the rear of the vehicle 1 when the tailgate 3 is open. The table board 2 can be adjusted between an out-of-use position and a position of use illustrated in FIGS. 1 to 4. In its out-of-use position, the table board 2 is accommodated completely in a load space 5 of the vehicle 1, this being symbolized in FIGS. 1 and 3 by a broken line. As can be seen from FIGS. 1 to 4, the table board 2 here forms the floor of the load space 5. It is likewise possible to form a compartment or slot for the table board 2 in the load space 5 underneath a fixed load-space floor, in which compartment the table board 2 can be stowed in its out-of-use position. This allows objects placed on the load-space floor, e.g. luggage, to remain in the load space 5 when the table board 2 is to be adjusted between its position of use and its out-of-use position.

The adjusting movement of the table board 2 is preferably performed horizontally or parallel to an underlying surface 6 on which the vehicle is standing.

Mounted on the underside of the table board 2 is a folding linkage 7 (FIGS. 1 and 2) or 7' (FIGS. 3 and 4), on which a seat 8 or 8' is mounted, respectively. In this arrangement, the seats 8 or 8' can be designed as individual seats or as bench seats. The table board 2 is hollow and open towards the bottom, thus forming a receptacle 9 for the seats 8 or 8' in the underside of the table board 2. The folding linkage 7 or 7' allows the seats 8 or 8' to be pivoted between an out-of-use position, in which the seats 8 or 8' are accommodated essentially completely by the seat receptacle 9, and a position of use, illustrated in FIGS. 1 to 4, in which a front edge of the seats 8 or 8' is close to one end of the table board 2 and underneath this end. In their out-of-use position, the seats 8 or 8' are thus accommodated in a particularly space-saving manner in the table board 2 while, in their position of use, the seats 8 or 8' are suitable for sitting at the table board 2.

Figure 2:
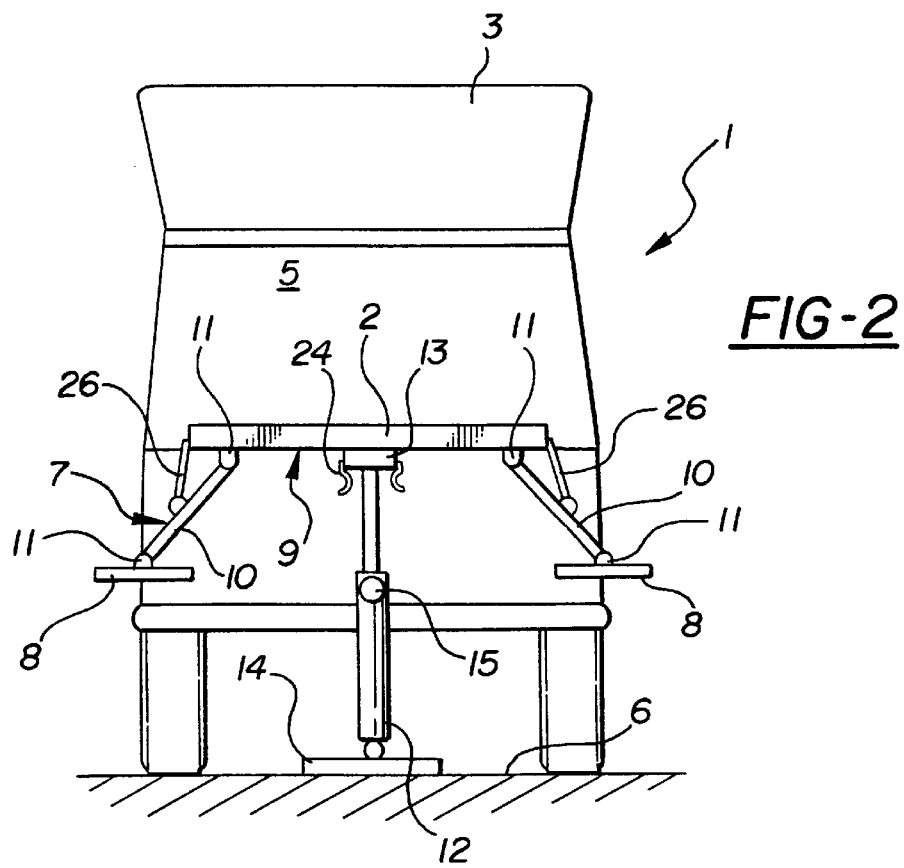
FIG. 2 shows a rear view of the rear area in accordance with FIG. 1.

In accordance with FIGS. 1 and 2, the folding linkage 7 has, in a first embodiment, a seat strut 10 for each seat 8, this strut being pivotally mounted on the table board 2 at one end and on the seat 8 at the other end. This mounting can be achieved by means of hinges 11 for example. To ensure a uniform relative position between the seat 8 and the table board 2 in the position of use of the seat 8, conventional locking means 26 can be provided to fix the seat strut 10 relative to the table board 2 and the seat 8 relative to the seat strut 10, for example. It is clear that these locking means will be of releasable design in order to allow easy pivoting between the position of use and the out-of-use position.

The embodiment shown in FIGS. 1 and 2 has a table leg 12 which is pivotally mounted on the underside of the table board 2 at one end, e.g. by means of a hinge 13, and, at the other end, has a supporting foot 14 which allows stable support on the underlying surface 6. The table leg 12 is of telescopic design by virtue of coaxially telescoping tubes, thus allowing the length of the table leg 12 to be adjusted. The desired length of the table leg can be fixed by means of a fixing wheel 15, for example. The table leg 12 is mounted on the table board 2 in such a way that it can be moved between the position of use illustrated in FIGS. 1 and 2, in which the table leg 12 supports the table board 2 on the underlying surface 6, and an out-of-use position, in which the table leg 12 is accommodated in a space-saving manner, preferably likewise in the seat receptacle 9. Additionally, the table leg 12 is preferably held in the out-of-use position by corresponding locking element 24.

Figure 3:
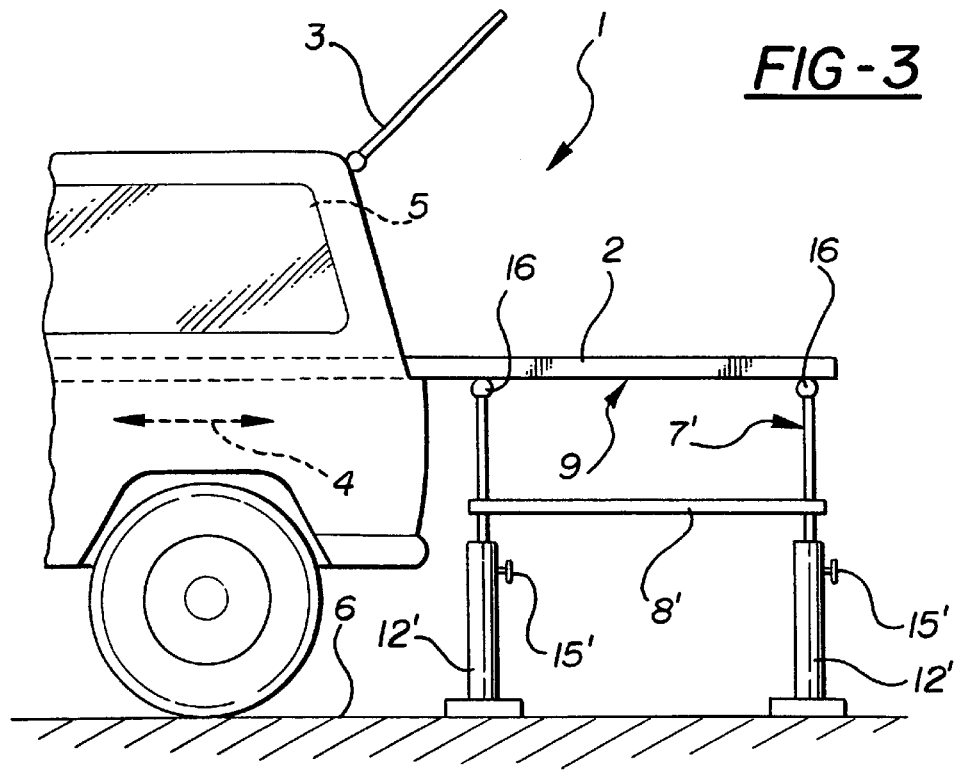
FIG. 3 shows a side view as in FIG. 1 but in another embodiment.
Figure 4:
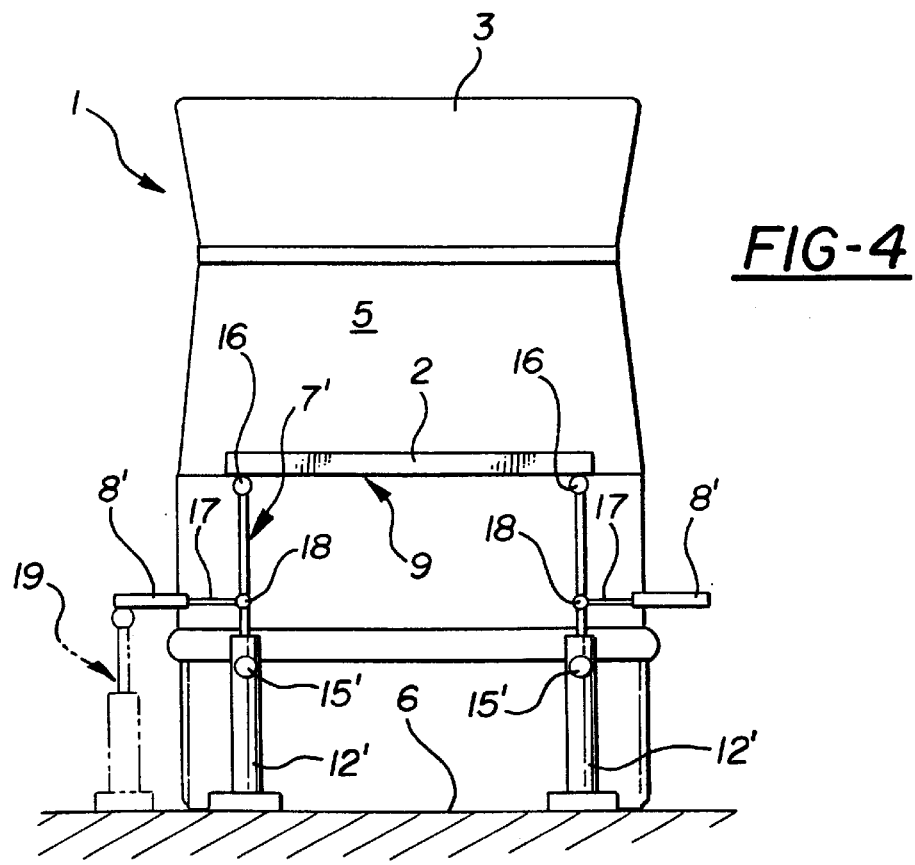
FIG. 4 shows a rear view as in FIG. 2 but in the embodiment in accordance with FIG. 3.

In accordance with the embodiment illustrated in FIGS. 3 and 4, the folding linkage 7' has two table legs 12' for each seat 8', these table legs preferably likewise being of telescopic design and thus allowing length adjustment with the possibility of fixing by means of fixing screws 15'. In this arrangement, the table legs 12' are mounted on the table board 2 by means of joints 16. The seats 8' are secured on the table legs 12' by means of seat supports 17, these seat supports 17 being mounted on the table legs 12' by way of beanings 18.

It is clear that corresponding locking means can also be provided here to allow the seats 8' to be locked or fixed in their position of use and enable them to be used as seating. In another embodiment, more stable support for the seats 8' can furthermore be provided by a seat leg 19 which supports the seat 8' on the underlying surface 6. The optional seat leg 19 is represented by broken lines in FIG. 4.

According to a preferred embodiment, the table leg 12 or a mechanism of this table leg 12 can be coupled to the folding linkage 7 or the seat 8 in such a way that the seat 8 can be adjusted between its out-of-use position and its position of use only after the table leg 12 has been moved into its position of use. In this way, it is possible to ensure that the seats 8 can only be used when the table board 2 is supported securely on the underlying surface 6.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A vehicle comprising:
   a table board having a position of use in which said table board projects longitudinally from the vehicle and an out-of-use position in which said table board is disposed within the vehicle, said table board includes a hollow receptacle formed on an underside thereof;
   a seat adapted to fit within said receptacle; and
   a folding linkage interconnecting said table board and said seat, said folding linkage enables said seat to transition between a position of use in which said seat is suitable for use as a sitting surface and a out-of-use position wherein said seat is stored within said receptacle.

2. The vehicle as set forth in claim 1, further comprising a table leg moveably mounted to said table board, said table leg includes a position of use and a out-of-use position, said table leg adapted to provide support to said table board while in said position of use by contacting an underlying surface.

3. The vehicle as set forth in claim 2, wherein said receptacle receives said table leg while said table leg in is its out-of-use position.

4. The vehicle as set forth in claim 2, wherein said seat can only be transitioned into said position of use when said table leg is in said position of use.

5. The vehicle as set forth in claim 2, wherein said table leg is mounted to said folding linkage.

6. The vehicle as set forth in claim 2, wherein said folding linkage forms portion of said table leg.

7. The vehicle as set forth in claim 2, wherein said table leg is telescopic in form and is adjustable in length thereby.

8. The vehicle as set forth in claim 2, wherein said table board forms a floor of the vehicle.

9. The vehicle as set forth in claim 2, further comprising a locking element which secures said seat in said position of use and a second locking element which secures said table leg in said out-of-use position.

10. A table for use in connection with a vehicle, said table comprising:
    a table board having a receptacle formed on an underside thereof;
    a seat;
    a folding linkage interconnecting said table board and said seat, said folding linkage for enabling said seat to transition between a position of use in which said seat is suitable for use as a sitting surface and a out-of-use position in which said seat and said folding linkage are substantially disposed within said receptacle;
    a table leg operatively connected to said table board for providing support thereto when said table board is in said position of use; and
    a means for attaching said table board to a vehicle, said attachment means adapted to retain said table board in a position of use in which said table board projects longitudinally from a vehicle and an out-of-use position in which said table board is disposed within a vehicle.

* * * * *